United States Patent [19]

Ullman et al.

[11] Patent Number: 4,513,728
[45] Date of Patent: Apr. 30, 1985

[54] AIR/FUEL INDUCTION SYSTEM FOR SPARK IGNITION INTERNAL COMBUSTION ENGINES, AND ELECTROMAGNETIC VALVES

[75] Inventors: Thomas J. Ullman, Cranfield; Colin F. Shadbolt, Leighton Buzzard; Brian C. Pagdin; David J. Marriage, both of Dunstable; Peter J. Clarke, Leighton Buzzard; Ian J. Sheppard, St. Albans, all of England

[73] Assignee: Solex (U.K.) Limited, Middlesex, England

[21] Appl. No.: 449,786

[22] Filed: Dec. 14, 1982

[30] Foreign Application Priority Data

Jan. 15, 1982 [GB] United Kingdom ............... 8201104

[51] Int. Cl.³ .......................................... F02M 13/06
[52] U.S. Cl. ................................. 123/527; 123/478; 123/480; 261/69 R; 251/61.5
[58] Field of Search ............... 123/527, 557, 480, 472, 123/478; 261/69 A, 69 R; 251/61.5; 137/DIG. 8

[56] References Cited

U.S. PATENT DOCUMENTS

| | | | |
|---|---|---|---|
| 2,357,947 | 9/1944 | Gerson | 123/527 |
| 2,696,714 | 12/1954 | Hughes . | |
| 2,821,843 | 2/1958 | Mengelkamp et al. | 123/527 |
| 3,543,784 | 12/1970 | Smith | 137/8 |
| 3,960,126 | 6/1976 | Shinoda | 123/527 |
| 4,020,810 | 5/1977 | Baverstock | 123/527 |
| 4,109,616 | 8/1978 | Zechnall et al. | 123/478 |
| 4,141,326 | 2/1979 | Wolber | 123/DIG. 12 |
| 4,335,697 | 6/1982 | McLean | 123/527 |

FOREIGN PATENT DOCUMENTS

| | | |
|---|---|---|
| 2131804 | 12/1972 | Fed. Rep. of Germany . |
| 2948449 | 4/1981 | Fed. Rep. of Germany . |
| 2365703 | 9/1977 | France . |
| 2456856 | 1/1981 | France .................... 123/527 |
| 542627 | 1/1942 | United Kingdom . |
| 847752 | 9/1960 | United Kingdom . |
| 1093573 | 12/1967 | United Kingdom . |
| 2014336 | 8/1979 | United Kingdom . |
| 1552937 | 9/1979 | United Kingdom . |
| 1565706 | 4/1980 | United Kingdom . |
| 1569655 | 6/1980 | United Kingdom . |

Primary Examiner—E. Rollins Cross
Attorney, Agent, or Firm—Parkhurst & Oliff

[57] ABSTRACT

A motor vehicle fuel system operable selectively to supply metered quantities of petrol or LPG in its gaseous state to a carburetter induction passage. The LPG system includes a single stage pressure regulator and an injection valve which may be a digital or an analogue valve. The regulator operates to vary the pressure of gaseous LPG with variations in engine loading by referring that pressure across a single diaphragm to the pressure established in the induction passage downstream of the throttle valve by operation of the engine, while maintaining that regulated gas pressure above that subsisting in the induction passage upstream of the throttle valve. An electronic control system, which may be an analogue control system or a digital control system incorporating a microprocessor having a data store matrix, responds to certain engine operating conditions and controls operation of the injection valve whereby the latter injects metered quantities of gaseous LPG for presentation to the induction passage upstream of the throttle valve in accordance with the requirements of the engine. If a digital injection valve is used, provision is preferably made for smoothing the pulsed output of that valve before it is presented to the induction passage.

17 Claims, 5 Drawing Figures

AIR/FUEL INDUCTION SYSTEM FOR SPARK IGNITION INTERNAL COMBUSTION ENGINES, AND ELECTROMAGNETIC VALVES

BACKGROUND AND SUMMARY OF THE INVENTION

This invention relates to air/fuel induction systems for spark ignition internal combustion engines. Such systems comprise an air/fuel induction passage with a driver-operable throttle valve therein, and a fuel system by which gaseous fuel is presented to a location in the induction passage, the gaseous fuel being vaporized liquefied petroleum gas (LPG), or a natural gas, such as methane. This invention also relates to electromagnetic valves which are suitable for use in such systems.

Equipment for fueling motor vehicle spark ignition internal combustion engines with LPG which is available commercially at present is in the form of conversion kits by which an existing motor vehicle spark ignition internal combustion engine installation which includes a petrol supply system incorporating a carburetter is converted to either an LPG supply system or a dual fuel system such that the engine can be fueled by either LPG or petrol at the choice of the driver.

Such commercially available LPG fuel system equipment comprises an LPG storage tank, a vaporizer, a vaporized LPG pressure regulator, and a mixer unit. LPG is stored under pressure in liquid form in the tank. The vaporizer is connected between the interior of the tank and the mixer unit which in turn is fitted to the carburetter so that it communicates with the carburetter induction passage when the equipment is fitted. A shut off valve is provided between the vaporizer and the LPG tank when the engine installation is converted into a dual fuel system and that shut off valve is normally closed but is opened automatically by the action of the driver selecting LPG fuel for fueling the engine. The vaporizer is adapted to vaporize liquefied petroleum gas fed to it from the storage tank, the vaporization being effected by reducing the pressure of the liquefied petroleum gas and bringing it into a heat exchange relationship with water tapped from the engine cooling system, the vaporized LPG being collected in a chamber which is in direct communication with the carburetter induction passage via the mixer unit. The pressure regulator includes means whereby the pressure of vapour in that chamber is maintained at a substantially constant near atmospheric pressure. Hence vaporized LPG is drawn into the carburetter induction passage via the mixer unit by engine suction and is mixed with the air flow through the induction passage to form the air/fuel mixture that is fed to the engine by the carburetter in the usual way. The amount of vaporized LPG drawn into the carburetter induction passage is controlled by operation of the mixer unit which is controlled by the demand signal that comprises engine suction. German Offenlegungsschrift No. 2131804 and U.S. Pat. Nos. 3,960,126 and 4,020,810 are concerned with such LPG fuel systems.

Such commercially available LPG fuel system conversion equipment rarely leads to the true potential of LPG as a low emission fuel being realised. The functional performance characteristics of this equipment are inadequately matched to the requirements of the engine. Even though the engine is tolerant, there are problems on fuel enrichment. Also the low temperature operation of the equipment is often unsatisfactory.

The equipment is critically dependent upon the mixer units but it has proved difficult to design mixer units which are sufficiently flexible in their application for them to be properly matched with the engine's requirements. Furthermore the mixer units of the LPG conversion equipment can significantly influence the operation of the basic petrol fuel system in an undesirable manner.

The fact that the delivery stage of the part of the equipment that includes the vaporizer and pressure regulator operates at a low, near atmospheric pressure leads to a requirement for large "active" areas but the resultant design compromise limits accuracy, sensitivity, dynamic response and durability of the equipment. Attempts to minimise these functional deficiencies have tended to increase the level of complexity of the mechanically operable pressure regulating equipment. German Offenlegungsschrift No. 2131804 and U.S. Pat. No. 3,960,126 disclose systems which incorporate complicated two stage pressure regulators which operate to vary the pressure of the vaporized fuel within a narrow range of pressures which are substantially constant and near atmospheric pressure and which comprise a control pressure chamber at ambient pressure which is bounded by two diaphragms and which separates the vaporized fuel from another chamber which is in communication with the engine air/fuel induction passage downstream of the driver-operable throttle valve. U.S. Pat. No. 4,020,810 discloses the use of an economiser valve which is responsive to pressure regions in the engine air/fuel induction passage upstream from and downstream from the driver-operable throttle valve, and which is effective to modify the pressure in a control pressure chamber of a vaporized fuel pressure regulator to cause it, under certain conditions, to lean out or enrich the charge supplied from the pressure regulator to a conventional mixing valve which supplies air according to engine demand.

An object of this invention is to provide fuel system equipment for fueling a motor vehicle spark ignition internal combustion engine with gaseous fuel, such as LPG, the equipment having functional performance characteristics which are more adequately matched to engine requirements than are those of commercial LPG fuel system equipment currently available, and being relatively simple from the mechanical viewpoint.

According to one aspect of this invention there is provided an air/fuel induction system for a spark ignition internal combustion engine, the system comprising an air/fuel induction passage with a driver-operable throttle valve therein, and a fuel system by which gaseous fuel is presented to a location in the induction passage; the fuel system comprising pressure regulating means operable to regulate the pressure of the gaseous fuel and conduit means by which the gaseous fuel is conveyed to said location, the pressure regulating means being adapted to respond to changes in a depression which is established downstream of the throttle valve by operation of the engine and to effect a consequent change in the regulated pressure of the gaseous fuel such that it varies in the opposite sense to variations of said depression; wherein the pressure regulating means are adapted to maintain the gaseous fuel at a pressure higher than that established at said location by operation of the engine and comprise a single movable wall which separates two chambers, one of the two chambers containing gaseous fuel at the regulated pressure and the other chamber being in communication with said induction passage downstream of said throttle valve, there being an injection valve in said conduit means operable to effect injection of metered quantities of said gaseous fuel whereby said gaseous fuel is presented to said location, and control means responsive to certain engine operating conditions and operable to control operation of said injection valve in accordance with those conditions such that the volumetric flow rate at which said gaseous fuel is injected for presentation to said location is matched to the operational requirements of the engine.

Accordingly, in operation of the present invention, instead of presenting fuel vapour to the carburetter induction passage via a mixer unit and relying on engine suction to draw that vapour into the induction passage via the mixer unit from the delivery chamber wherein the pressure of the vapour is maintained substantially constant and near atmospheric pressure by operation of the pressure regulator, we maintain and regulate the pressure of gaseous fuel in the delivery stage at a higher level which we vary automatically in accordance with, but in the opposite sense to, changes in the engine inlet manifold depression by means of a simple single stage pressure regulator, and we inject that gaseous fuel into the carburetter induction passage, whilst controlling the opening of the injection valve automatically in accordance with certain measured engine operating parameters, such as engine speed and engine load. By varying the gaseous fuel injection pressure in accordance with engine operating conditions as well as controlling the opening of the injection valve in accordance with measured engine operating conditions, we are better able to match the performance of the fuel system to the requirements of the engine than is possible by merely controlling the valve opening. The gaseous fuel fed to the injection valve should be a dry gaseous fuel without any liquid phase otherwise uniform fuel metering cannot reasonably be expected. The range of control of such an injection valve is limited in practice to such an extent that it is insufficient to adequately match the supply of a gaseous fuel to the requirements of the engine over the full range of engine operation if that gaseous fuel is injected at a constant pressure.

Preferably the pressure regulating means include a pressure relief valve operable to vent said one chamber into said other chamber and hence to said induction passage downstream of said throttle valve, should the pressure in said one chamber exceed a predetermined maximum.

Conveniently the injector valve is controlled electromagnetically by said control means. It may be a digital valve, that is to say a valve which is so controlled for digital operation, viz. continual valve opening and closing at a controlled frequency and duration of operation. Such a digital valve is advantageous as compared with a simple analogue valve since friction is not a significant influence on its operation. However the output from a digital injection valve is a pulsed flow of gaseous fuel and we have not been able to synchronise that pulsed flow with operation of the engine so that fuel distribution problems follow from the use of a digital injection valve. With these difficulties in mind we prefer to make provision for smoothing the pulsed output of the digital injection valve prior to its presentation to said location in said induction passage. Such provision may include arranging for said conduit means to communicate with said induction passage through a diffuser arrangement which circumferentially surrounds said induction passage at said location and which causes the pulsed output of the digital injection valve to circulate around the induction passage and be spread circumferentially therearound for presentation to said location through a circumferentially-extending inlet provided. Additionally or alternatively the dimensions of the flow path between the digital injection valve and the induction passage may be selected so that smoothing of the pulsed output from the digital injector valve is effected in that flowpath.

The control means may comprise an analogue valve drive circuit adapted to process an electrical input signal which is the product of electrical signals indicative of measured values of engine speed and engine load, into a valve driving signal, or a digital drive circuit including a microprocessor having a data store matrix which is addressed by the electrical signals indicative of measured values of engine speed and engine load, the microprocessor responding automatically to provide the appropriate valve driving signal derived from data stored in the matrix.

If the injection valve is a digital valve and it is operated at a constant frequency, the opening pulse width being selected in accordance with control signals derived from signals indicative of measured values of engine speed and engine load, its dynamic range is not sufficiently wide for it to respond to all the control signals that are applied to it. With this problem in mind, we prefer that the digital valve control means are arranged so that, for all operations of the digital valve below a predetermined fuel demand requirement of the engine, the valve is operated with a constant opening pulse width at a respective frequency selected automatically from within the range of operating frequencies of the valve in accordance with the measured values of engine speed and engine load, whereas for all operations of the valve at or above said predetermined fuel demand requirement, the valve is operated at maximum frequency, the opening pulse width being selected automatically in accordance with the measured values of engine speed and engine load. Controlling the digital injection valve in this way results in its having a wider dynamic range than it would have if it was always operated at maximum frequency.

U.S. Pat. No. 4,141,326 discloses a closed loop fuel control system for a hydrogen fuelled engine which electronically controls fuel delivery to the engine in response to signals indicative of the engine's operating parameters and a signal generated by a hydrogen sensor in the exhaust manifold to maintain the concentration of hydrogen in the exhaust at a predetermined level. The means of metering the flow of hydrogen to the engine comprises an electrically controlled valve of digital or analogue type. Various analogue circuits for driving the valve are described as is the use of digital electronics.

According to another aspect of this invention there is provided an air/fuel induction system for a spark ignition internal combustion engine, the system comprising an air/fuel induction passage with a driver-operable throttle valve therein, and a fuel system by which gaseous fuel is presented to a location in the induction passage; the fuel system including conduit means by which the gaseous fuel is conveyed to said location, a digital injection valve in said conduit means operable to effect injection of metered quantities of said gaseous fuel whereby said gaseous fuel is presented to said location, and control means responsive to certain engine operating conditions and operable to control operation of said digital injection valve in accordance with those conditions such that the volumetric flow rate at which said gaseous fuel is injected for presentation to said location is matched to the operational requirements of the engine; wherein gaseous fuel flow smoothing means are provided within said conduit means between said injection valve and said induction passage whereby the pulsed output of the digital injection valve is smoothed prior to its presentation to said location in said induction passage.

According to another aspect of this invention an electromagnetic digital valve is controlled so that, for all operations below a predetermined "mark space ratio" (M.S.R.), it is operated with a constant opening pulse width at a respective frequency selected automatically from within the range of operating frequencies of the valve in accordance with certain external control parameters, whereas, for all operations at or above said predetermined M.S.R., it is operated at a maximum frequency, the opening pulse width being selected automatically in accordance with the external control parameters.

According to yet another aspect of this invention, operation of an internal combustion engine digital electromagnetic fluid fuel injection valve is controlled at a frequency which is not synchronised with the speed of the engine by a control arrangement comprising a microprocessor having a data store matrix which is addressed by electrical signals indicative of measured values of engine speed and engine load, the microprocessor responding automatically to determine the frequency and pulse width of the digital valve driving signal from data stored in the matrix, the valve having a range of possible operating frequencies and pulse widths.

BRIEF DESCRIPTION OF THE DRAWINGS

An LPG fueling system in which this invention is embodied is described now by way of example with reference to the accompanying drawings, of which.

DETAILED DESCRIPTION OF THE PREFERRED EMBODIMENT

Figure 1:
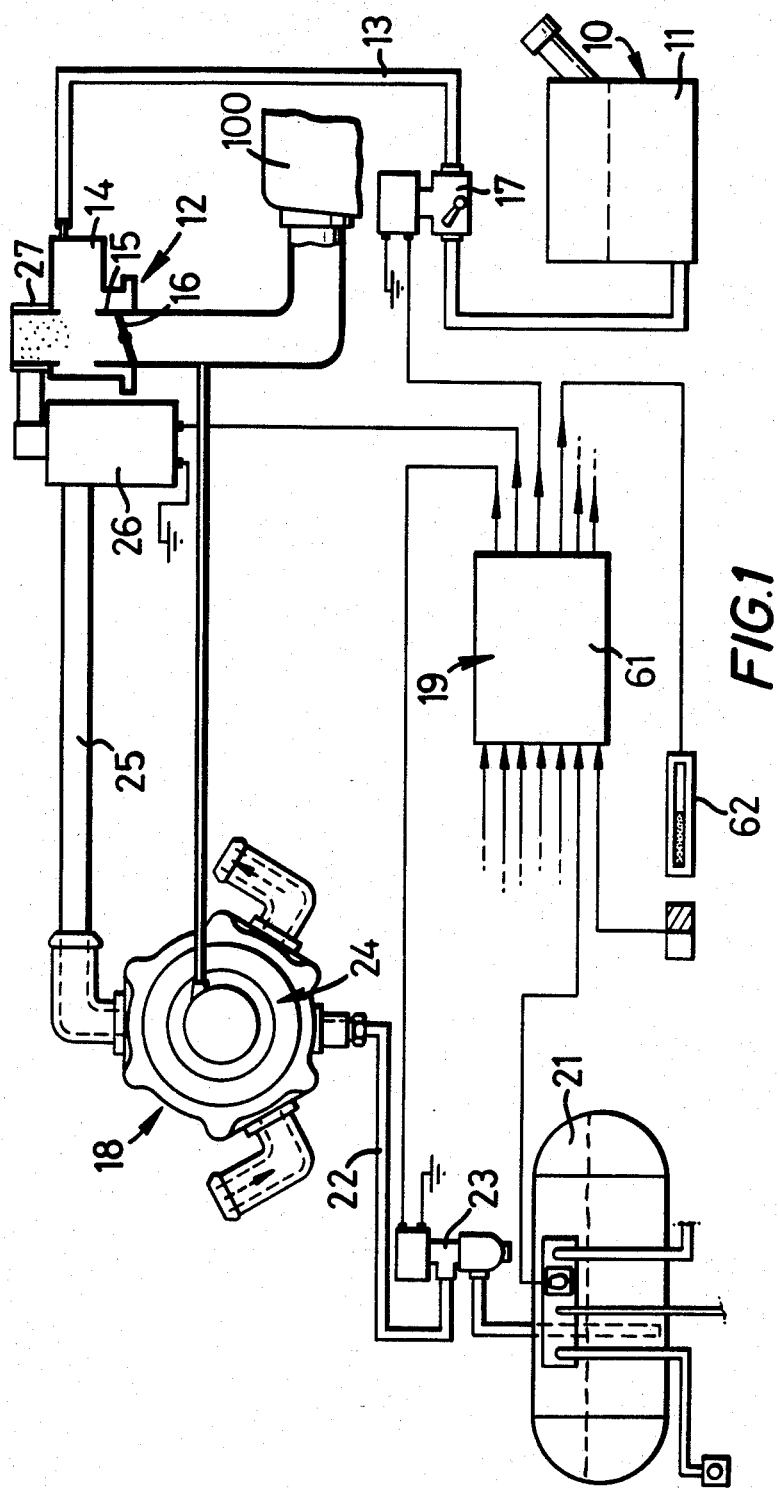
FIG. 1 is a schematic diagram of the system which comprises an LPG conversion kit fitted to a spark ignition internal combustion engine installation which includes a petrol supply system incorporating a carburetter.

FIG. 1 shows a dual fueling system of a motor vehicle formed by fitting an LPG conversion kit to the original petrol system of the spark ignition internal combustion engine 100.

The original petrol system 10 comprises a petrol tank 11, a carburetter 12 and piping 13 by which petrol is conveyed from the tank 11 to a float chamber 14 of the carburetter 12. The carburetter 12 has an air/fuel induction passage 15 and a driver-operable throttle valve 16 in the passage 15 whereby the driver controls flow to the inlet manifold of the engine 100 of a mixture of air which is drawn into the induction passage 15 through the usual air cleaner by operation of the engine 100 and petrol which is drawn into the induction passage 15 from the float chamber 14 through a metering section by operation of the engine 100.

The conversion comprises fitting a solenoid-operated shut-off valve 17 into the piping 13, installing an LPG system 18 and connecting its LPG delivery to the carburetter induction passage 15 adjacent the upstream end of that passage, and installing an electronic control system 19 which includes various transducers which sense respective operating parameters of the engine 100 and emit control signals derived from the sensed operating parameters.

The LPG system 18 comprises an LPG storage tank 21, a liquid transfer pipeline 22 including a solenoid-operated shut-off valve 23, a vaporizer/pressure regulator unit 24, piping 25 by which vaporized LPG is conveyed from the unit 24 to an injection valve 26 and means 27 by which vaporized LPG injected by the injection valve 26 is directed into the induction passage 15 of the carburetter 12 at a location upstream of the carburetter throat in the sense of the direction of air flow through the induction passage 15. It is desirable that the vaporizer is effective to change the liquid LPG into a dry fuel gas with substantially no liquid phase so that the injection valve 26 can operate predictably to meter the injection of that fuel.

The LPG storage tank 21, the liquid transfer pipeline 22 and the LPG shut-off valve 23 may be conventional and are not described here.

Figure 2:
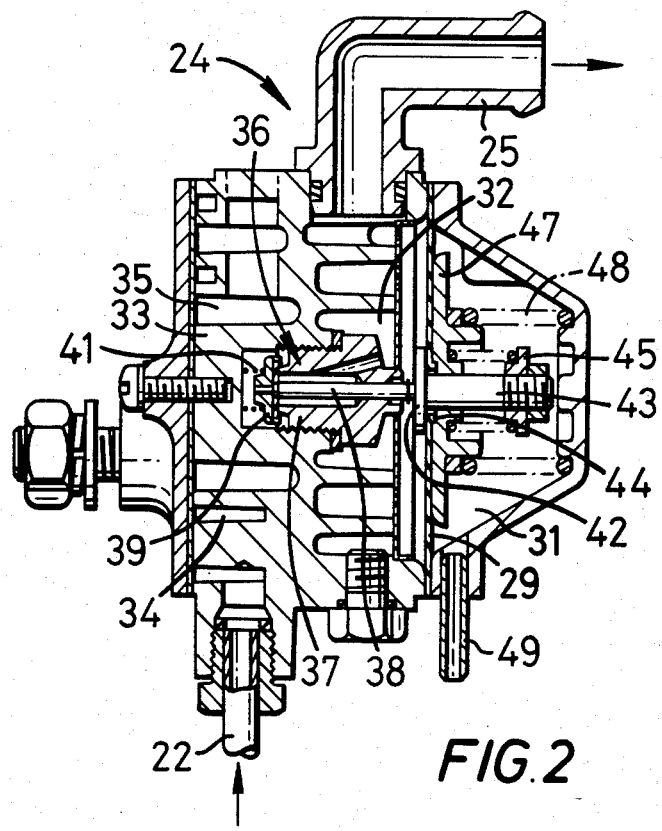
FIG. 2 is a cross-section of the vaporizer/pressure regulating unit of the system shown in FIG. 1.

FIG. 2 shows that the vaporizer/pressure regulator unit 24 comprises a hollow casing 28 which is divided internally by a diaphragm 29 into two chambers 31 and 32. The wall of the chamber 32 that faces the diaphragm 29 is formed by a casting 33 which is formed with projections that form baffles projecting into the interior of the chamber 32.

Two spiral passages 34 and 35 are formed substantially concentrically within the casting 33. The liquid transfer pipeline 22 is connected into the spiral passage 34 which leads to the high pressure, or inlet side of an expansion valve 36 which is mounted in the casting 33, substantially at the centre thereof and which controls fluid flow from the spiral passage 34 into the chamber 32. The spiral passage 35, which has a substantially larger cross sectional area than the spiral passage 34, is connected into the cooling water system of the engine 100 and extends between the turns of the spiral passage 34.

The expansion valve 36 comprises a valve body 37 with through passages formed in it, and an obturating member 38 which slides within a central one of the passages in the valve body 37. The obturating member 38 projects from both ends of the valve body 37 and carries a sealing head 39 at its end which communicates with the passage 34. The sealing head 39 is urged by a coil spring 41 to seat on the valve body 37 and thereby isolate the passage 34 from the through passages through the valve body 37.

A disc 42 is mounted at one end of a rod 43 which extends slidably through a bush 44 which is fitted into a central aperture of the diaphragm 29. The disc 42 is within the chamber 32. The rod 43 carries a reaction ring 45 within the chamber 32. A coil spring 46 reacts against the reaction ring 45 and urges an annular disc 47 against the diaphragm 29 so that the central part of the diaphragm 29 is sandwiched between the disc 42 and the annular disc 47 in a gas-tight manner. A third coil spring 48 urges the annular disc 47, and hence the diaphragm 29 towards the casting 33.

The chamber 31 is connected by a pipe 49 to the inlet manifold of the engine downstream of the carburetter throttle valve 16. The chamber 32 communicates with the piping 25. The spiral passage 35, which is connected into the engine cooling water circuit, hence comprises one part of a heat exchange section of the vaporizer/pressure regulator unit 24 by which the LPG in the passage 34 and gaseous LPG in the chamber 32 are brought into heat exchange with water in the engine cooling water circuit. The engine cooling water serves as a source of heat for vaporization of the liquid LPG during expansion of that LPG as it flows from the passage 34 to the chamber 32 through the expansion valve 36.

The arrangement of the diaphragm 29 and the third coil spring 48 is such that a constant pressure differential is maintained across the diaphragm 29. Hence the pressure of gaseous LPG in the chamber 32 is regulated so that it varies with variations in the inlet manifold depression but in the opposite sense to the changes in the inlet manifold depression. Thus, for an increasing power requirement from the engine 100, an increasing pressure gaseous LPG feed to the injection valve 26 is available allowing a potential increase in flow of gaseous LPG to the engine. The pressure of gaseous LPG in the chamber 32, and hence in the conduit formed by the piping 25 leading to the injection valve 26, is also regulated so that it is between the pressure in the storage tank 21 and the pressure in the carburetter induction passage 15 upstream of the carburetter throat. In a practical application of this embodiment of this invention, the pressure of gaseous LPG in the chamber 32 is modulated to 0.8 bar (12 p.s.i.) above the absolute pressure in the engine inlet manifold. Thus as full load of the engine 100, the pressure of gaseous LPG in the chamber 32 is approximately 0.8 bar (12 p.s.i.), and at low loads or idle conditions it is approximately 0.2 bar (3 p.s.i.).

Connection of the chamber 31 to the inlet manifold of the engine 100, as distinct from connecting that chamber to the surrounding atmosphere under the bonnet of the motor vehicle, avoids undesirable influences on fuel flow to the engine 100 that may follow from changes in the pressure under the bonnet of the motor vehicle and from the restriction due to the air cleaner.

The arrangement of the rod 43 that is axially-slidable in the bush 44, the disc 42 and 47, the abutment ring 45, the coil spring 46 and the portion of the surface of the chamber 31 that faces the end of the rod 43 in that chamber 31, serves as an over pressure relief valve for the vaporizer/pressure regulator unit 24 which protects that part of the system between the expansion valve 36 and the carburetter 12 from being subjected to the LPG storage tank pressure in the unlikely event of a failure of the regulator. The bush 44 is permeable by gaseous LPG and serves as a vent path to the chamber 31 for gaseous LPG in the chamber 32 when the pressure in the chamber 32 exceeds a predetermined maximum causing the spring 46 to collapse so that the diaphragm 29 separates from the disc 42. Any gaseous LPG vented from the chamber 32 via the bush 44 is directed to the engine inlet manifold via the chamber 31 and the pipe 49.

The injection valve 26 is electronically controlled by the control system 19 with the flow of gaseous LPG fluid through it being regulated by operation of a solenoid. The flow of gaseous LPG to the carburetter induction passage 15 is regulated by alteration of the effective bleed area available for the gas flow through the injection valve 26 which is adapted to shut off the flow of gaseous LPG to the carburetter 12 for the minimum flow condition and is operable to allow flow to the carburetter induction passage 15 up to a maximum flow. The actual effective bleed area for the flow of gaseous LPG through the injection valve 26 at any instant is determined by the electronic control system 19 and is a function of measured engine speed and a load sensing parameter, conveniently the angle of the throttle plate of the throttle valve 16 although any other engine load parameters such as engine inlet manifold pressure could be used.

Figure 3:
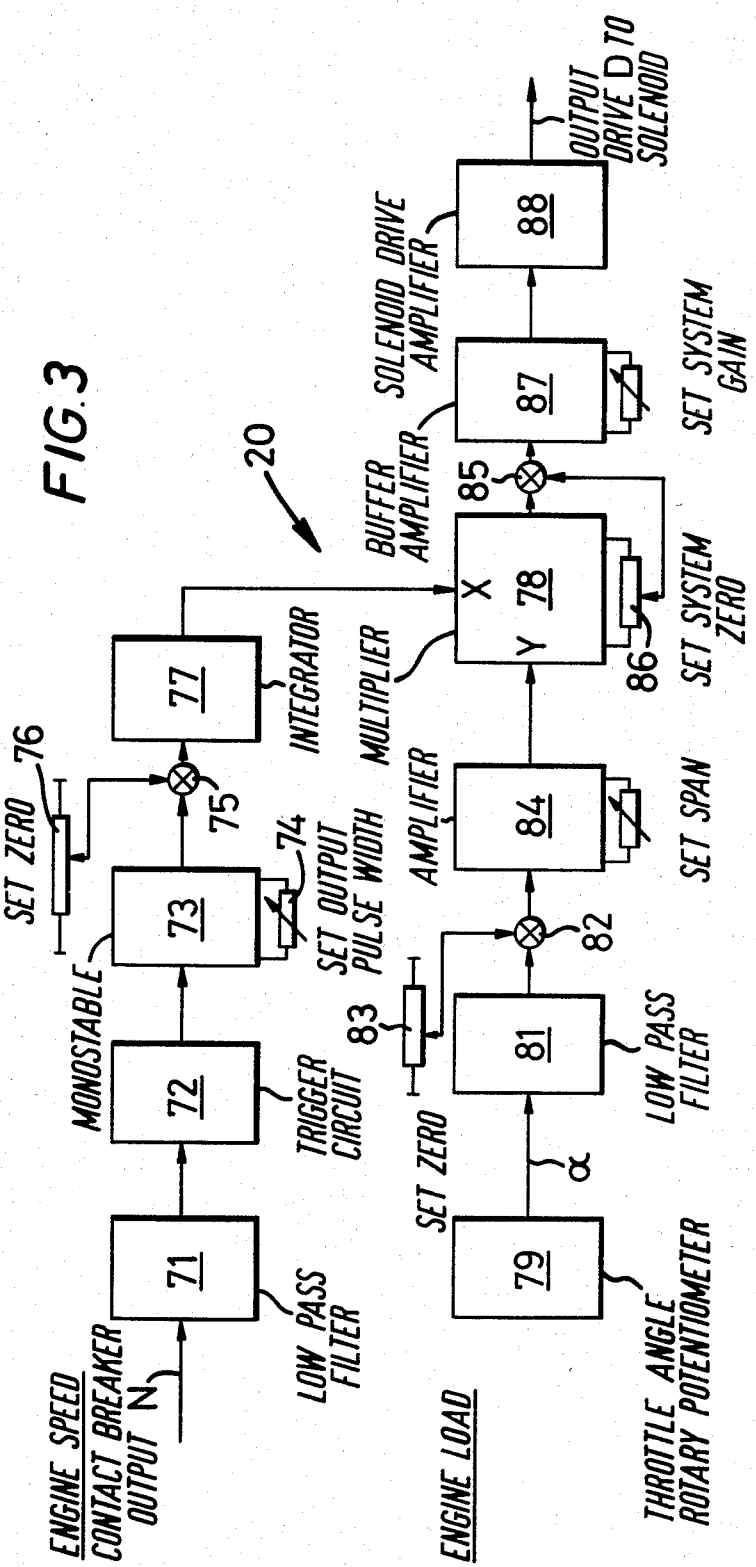
FIG. 3 is a diagram of an analogue electronic control system for controlling operation of the injection valve for the system shown in FIG. 1.

FIG. 3 is a block diagram illustrating an analogue electronic control circuit 20 which may form part of the electronic control system 19 and by which measured values of engine speed derived from the vehicle engine contact breaker output N and of engine load derived from a transducer output $\alpha$ are used to generate an appropriate solenoid drive signal by which the solenoid is energised to operate the injection valve 26 for the required flow of gaseous LPG.

The engine speed signal N comprises a series of pulses having a frequency which is the measure of engine speed. The signal N is conditioned by being passed through a low pass filter 71, where unwanted high frequency components are removed, to a trigger circuit 72 which produces a pulse output having a frequency which depends on the signal received from the filter 71. The pulse output from the trigger circuit 72 is fed to a monostable device 73 which emits a pulse output at the same frequency as the output from the trigger circuit 72 and having a constant pulse length which is determined by the setting of a variable resistance 74 with which the monostable device 73 is provided. The output signal from the monostable device 73 is mixed in a mixer 75 with a reference voltage obtained from a tapping of a potentiometer 76 whereby that signal is located relative to zero prior to feeding it to the input of an integrator 77. The output of the integrator 77, which is proportional to the average number of pulses per unit time and hence to the frequency of the engine speed signal N, is fed to one input of a multiplier 78.

A rotary potentiometer 79, which is mounted on the spindle of the throttle valve 16, serves as the transducer having the output $\alpha$ which is a measure of engine load. The output signal $\alpha$ is passed through a low pass filter 81 whereby unwanted high frequency components are removed. The output from the filter 81 is mixed in a mixer 82 with a reference voltage obtained from a tapping of a potentiometer 83 whereby that output signal is located relative to zero. The signal is then amplified in an amplifier 84 to a level at which it is compatible with the output from the integrator 77, and is then fed to another input of the multiplier 78.

The output signals from the integrator 77 and the amplifier 84, which are indicative respectfully of engine speed and engine load, are multiplied together by the multiplier 78. The output from the multiplier 78 is mixed in a mixer 85 with a reference voltage, which is tapped from a potentiometer 86 which is connected into the multiplier 78, whereby that output is located relative to zero, and then is fed through a buffer amplifier 87 to an amplifier 88 which generates an analogue output signal which is the solenoid drive signal D.

Figure 4:
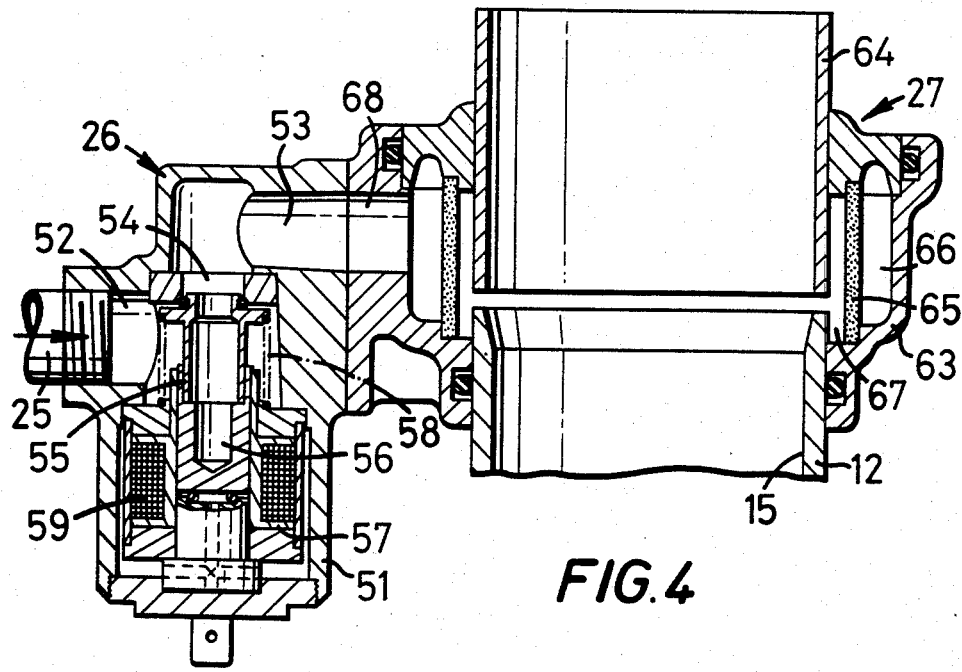
FIG. 4 is a cross-section of assembly of a digital injection valve, which serves as the injection valve in the system shown in FIG. 1, and of the upstream end of the carburetter of that system.

A solenoid drive signal produced by the circuit 20 illustrated in FIG. 3 is appropriate for energising an analogue type injection valve. However such valves have problems due to friction which do not arise if a digital type injection valve is employed. Accordingly we prefer to use a digital type injection valve such as is illustrated in FIG. 4. Whereas the effective bleed area of an analogue valve is the cross-sectional area of the space between the movable valve element and an orifice with which it co-operates, the location of that valve element relative to the orifice being a function of the magnitude of the D.C. current (viz. the solenoid drive signal) by which the solenoid winding is energised to locate that valve element, the effective bleed area of a digital valve; which continually opens and closes, is related to the frequency of its opening and the duration of each opening which in turn is determined by the width of the energising electrical pulse that is the respective solenoid drive signal. The analogue output signal from the solenoid drive signal generating amplifier 88 would be converted into an appropriate pulse solenoid drive signal by an analogue to digital converter.

FIG. 4 shows that the digital injection valve comprises a hollow body 51 having an internal cavity, an inlet port 52 and an outlet port 53 formed therein, the inlet and outlet ports 52 and 53 communicating with the internal cavity on either side of an orifice 54 in a member which spans the internal cavity. A valve 55 is mounted on a plunger 56 of magnetic material which is slidable in the bore of a tubular core 57 which is mounted in the internal cavity coaxially with the orifice 54 and on the same side of the orifice 54 as the inlet port 52. The valve 55 is urged to seat in the orifice 54 by a coil spring 58. A solenoid winding 59 is wound around the core 57 and is arranged to unseat the valve 55, against the action of the coil spring 58 when it is energised, the plunger 56 serving as an armature of the solenoid. The bore of the tubular core 57 is closed at its end remote from the orifice 54 by a plug which is recessed at its end which is nearer to the orifice 54. An O-ring is seated in the recess and serves as a resilient cushion which prevents metal to metal contact of the plunger 56 with the plug.

The solenoid winding 59 is energised by a pulsed drive signal generated by the control system 19 so that the valve 55 is repreatedly unseated and reseated to allow pulses of gaseous LPG to pass through the orifice 54 to the outlet port 53. The effective bleed area of the valve 55 for a certain period of operation of that valve 55 is related to the M.S.R. of the pulse drive signal, that is to say it is related to the ratio of the total of the durations of all solenoid energising pulses during that period to the remainder of that period, and hence is related to the frequency and pulse width of the pulsed drive signal.

We have not been able to adequately match the supply of gaseous LPG produced by operation of the digital injection valve 26 to the requirements of the engine 100 by merely altering the pulse width of the solenoid drive signal whilst operating the solenoid valve at maximum frequency. In order to increase the dynamic range of operation of the digital injection valve 26, and thus more adequately match the resultant flow of gaseous LPG to the requirements of the engine 100, the electronic control system 19 is arranged so that, for all operations of the valve 55 below a predetermined fuel demand requirement of the engine 100 (say approximately 15% as is illustrated graphically in FIG. 5), the valve 55 is operated with a constant opening pulse width at a frequency within a range of frequencies that increases as the engine fuel demand requirement increases. This arrangement is illustrated by the portions of the upper two curves in FIG. 5 to the left hand side of the dotted line. On the other hand for all other operations of the valve 55, that is to say operations to the right of the dotted line in FIG. 5, the solenoid drive signal is at maximum frequency and a pulse width which increases as the engine fuel demand requirement increases.

Figure 5:
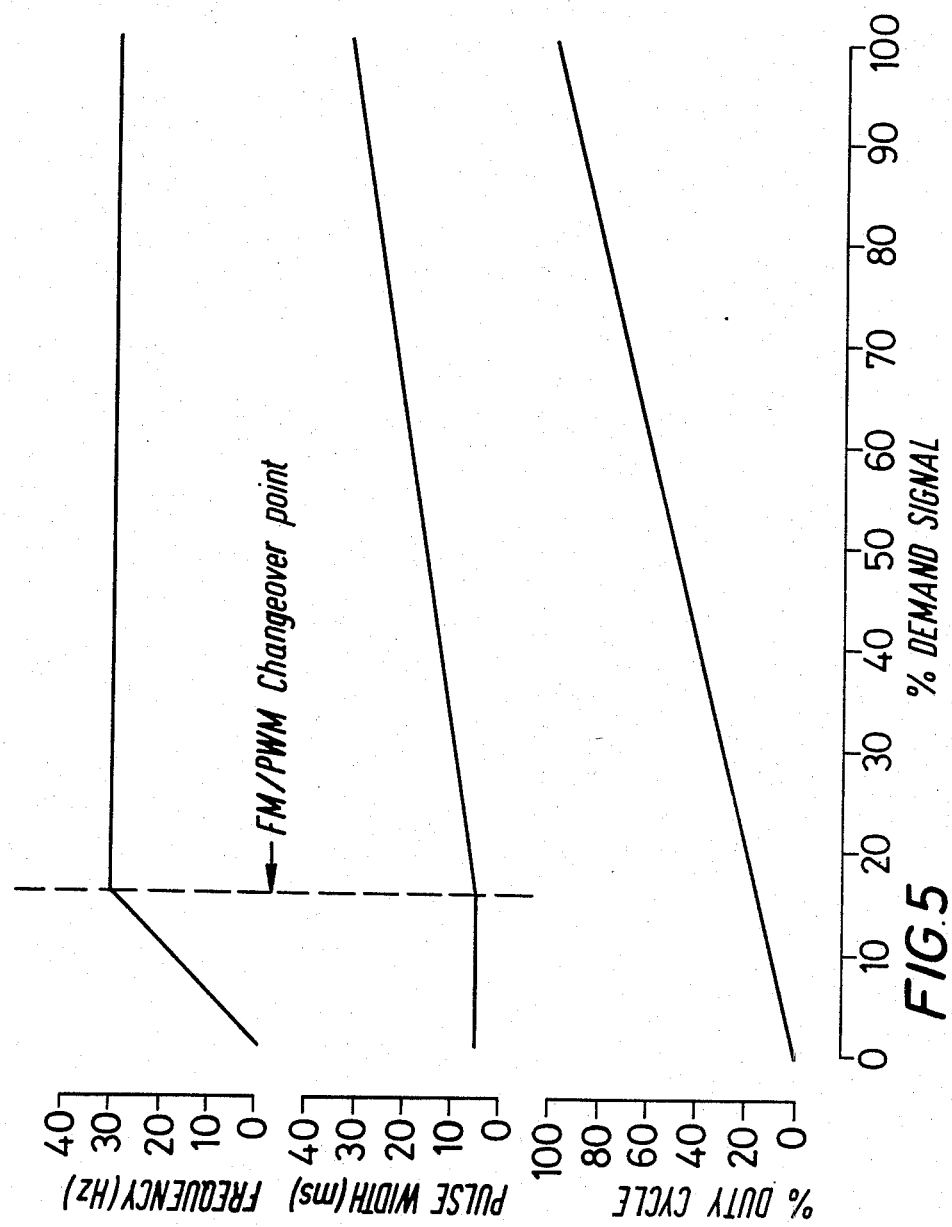
FIG. 5 is a graphical illustration of operation of the digital injection valve shown in FIG. 4.

Although the electronic control system 19 could incorporate an analogue control circuit similar to the circuit 20 illustrated in FIG. 3 but modified to provide analogue to digital conversion means for further processing the output of the multiplier in order to convert that output to a pulsed solenoid drive signal having a frequency and pulse width for the sensed engine conditions according to the graphs shown in FIG. 5, we prefer to use a digital control system by which the measured engine speed and engine load parameter signals are fed each to a respective input terminal of a basic pulse frequency and pulse width memory device 61 (see FIG. 1). The device 61 is a microprocessor electronic device which comprises a compact digital store of optimum pulse widths and pulse frequencies for all engine running conditions substantially as illustrated by the graphs in FIG. 5, in the form of a matrix memory store of injector pulse frequencies and pulse widths tailored to match the engine requirements. The microprocessor device 61 is adapted, based on the two input parameters of engine speed and engine load, to emit an output pulsed signal which is the solenoid drive signal appropriate for the sensed engine condition as illustrated in FIG. 5.

The electronic control system 19 provides other facilities including the selection of the fuel being used, be it petrol or LPG, and thus control of the opening of the selected one of the petrol solenoid shut-off valve 17 and the LPG solenoid shut-off valve 23. The control system 19 conveniently includes a switch 62 on the vehicle dash board by which the fuel is selected.

FIG. 4 shows that the outlet port 53 of the digital injection valve 26 is connected to the carburetter induction passage 15 through a diffuser arrangement by which the pulsed output of the digital injection valve 26 is smoothed before entering the carburetter induction passage 15.

The diffuser arrangement comprises a casing 63 which is fitted onto that part of the carburetter body that forms the upper end of the induction passage 15 and which receives an air supply duct 64 by which a supply of clean air for the engine 100 is conveyed to the upstream end of the carburetter induction passage 15. The diffuser arrangement circumferentially surrounds the upper end of the induction passage 15. There is a circumferentially continuous gap between the duct 64 and the body of the carburetter 12. The duct 64 is located relative to the induction passage 15 by the casing 63 which forms an annular gallery around the duct 64 and the carburetter body, there being communication between that gallery and the induction passage 15 via the gap. A cylindrical wall of porous material 65 divides the annular gallery into two coaxial annular chambers 66 and 67 and hence forms the radially inner boundary of the outer annular chamber 66. A port 68 in the side of the casing 63 communicates with the outlet port 53 of the digital injection valve 26 and connects that outlet port 53 to the outer annular chamber 66. Hence the piping by which the output of the injection valve 26 is connected to the diffuser 27 communicates freely with the outer annular chamber 66. Thus the pulsed output of gaseous LPG is conveyed from the outlet port 53 to the outer annular chamber 66 around which it circulates so that it is spread circumferentially therearound. The gaseous LPG passes through the porous wall 65 into the inner annular chamber 67 and from there into the carburetter induction passage 15 through the gap between the carburetter 12 and the air duct 64, whereby it is presented to the induction passage 15, the gap serving as an inlet to the induction passage 15. The length of the flow path for the output of gaseous LPG from the outlet port 53 of the digital injection valve 26 into the outer annular chamber 66 is selected carefully and may be long in order to further the smoothing of the pulsed output from the digital valve.

The LPG system 18 may be provided with a drain plug but it may not be necessary as the relatively high pressure flow of LPG may purge residuals from the LPG flow passages.

We claim:

1. An air/fuel induction system for a spark ignition internal combustion engine, the system comprising an air/fuel induction passage with a driver-operable throttle valve therein, and a fuel system by which gaseous fuel is presented to a location in the induction passage; the fuel system comprising pressure regulating means operable to regulate the pressure of the gaseous fuel and conduit means by which the gaseous fuel is conveyed to said location, the pressure regulating means being adapted to respond to changes in a depression which is established downstream of the throttle valve by operation of the engine and to effect a consequent change in the regulated pressure of the gaseous fuel such that it varies in the opposite sense to variations of said depression; wherein the pressure regulating means are adapted to maintain the gaseous fuel at a pressure higher than that established at said location by operation of the engine and comprise a single movable wall which separates two chambers, one of the two chambers containing gaseous fuel at the regulated pressure and the other chamber being in communication with said induction passage downstream of said throttle valve, there being an injection valve in said conduit means operable to effect injection of metered quantities of said gaseous fuel whereby said gaseous fuel is presented to said location, and control means responsive to certain engine operating conditions and operable to control operation of said injection valve in accordance with those conditions such that the volumetric flow rate at which said gaseous fuel is injected is matched to the operational requirements of the engine.

2. An air/fuel induction system according to claim 1, wherein the pressure regulating means include a pressure relief valve operable to vent said one chamber into said other chamber and hence to said induction passage downstream of the throttle valve, should the pressure in said one chamber exceed a predetermined maximum.

3. An air/fuel induction system according to claim 2, wherein the injection valve is controlled electromagnetically by said control means which comprise a digital drive circuit including a microprocessor having a data store matrix which is addressed by electrical signals indicative of measured values of engine speed and engine load, the microprocessor responding automatically to provide the appropriate valve driving signal derived from data stored in the matrix.

4. An air/fuel induction system according to claim 2, wherein the injection valve is controlled electromagnetically by said control means and is a digital valve, said digital valve being operable to continually open and close at a controlled frequency of opening and duration of each opening so as to control fuel flow in accordance with the frequency of its opening and the duration of each opening.

5. An air/fuel induction system according to claim 4, wherein gas flow smoothing means are provided for smoothing the pulsed output of the digital injection valve prior to its presentation to said location in said induction passage.

6. An air/fuel induction system according to claim 4, wherein the control means comprise a digital drive circuit including a microprocessor having a data store matrix which is addressed by electrical signals indicative of measured values of engine speed and engine load, the microprocessor responding automatically to provide the appropriate valve driving signal derived from data stored in the matrix.

7. An air/fuel induction system according to claim 6, wherein the digital valve control means are arranged so that, for all operations of the digital valve below a predetermined fuel demand requirement of the engine, the valve is operated with a constant opening pulse width at a respective frequency selected automatically from within the range of operating frequencies of the valve in accordance with the measured values of engine speed and engine load, whereas for all operations of the valve at or above said predetermined fuel demand requirement, the valve is operated at maximum frequency, the opening pulse width being selected automatically in accordance with the measured values of engine speed and engine load.

8. An air/fuel induction system according to claim 4, wherein the digital valve control means are arranged so that, for all operations of the digital valve below a predetermined fuel demand requirement of the engine, the valve is operated with a constant opening pulse width at a respective frequency selected automatically within the range of operating frequencies of the valve in accordance with measured values of engine speed and engine load, whereas for all operations of the valve at or above said predetermined fuel demand requirement, the valve is operated at maximum frequency, the opening pulse width being selected automatically in accordance with the measured values of engine speed and engine load.

9. An air/fuel induction system according to claim 1, wherein the injection valve is controlled electromagnetically by said control means.

10. An air/fuel induction system according to claim 9, wherein the control means comprise an analogue valve drive circuit adapted to process an electrical input signal which is the product of electrical signals indicative of measured values of engine speed and engine load, into a valve driving signal.

11. An air/fuel induction system according to claim 9, wherein the control means comprise a digital drive circuit including a microprocessor having a data store matrix which is addressed by electrical signals indicative of measured values of engine speed and engine load, the microprocessor responding automatically to provide the appropriate valve driving signal derived from data stored in the matrix.

12. An air/fuel induction system according to claim 9, wherein the injection valve is a digital valve, said digital valve being operable to continually open and close at a controlled frequency of opening and duration of each opening so as to control fuel flow in accordance with the frequency of its opening and the duration of each opening.

13. An air/fuel induction system according to claim 12, wherein gas flow smoothing means are provided for smoothing the pulsed output of the digital injection valve prior to its presentation to said location in said induction passage.

14. An air/fuel induction system according to claim 12, wherein the control means comprise a digital drive circuit including a microprocessor having a data store matrix which is addressed by electrical signals indicative of measured values of engine speed and engine load, the microprocessor responding automatically to provide the appropriate valve driving signal derived from data stored in the matrix.

15. An air/fuel induction system according to claim 14, wherein the digital valve control means are arranged so that, for all operations of the digital valve below a predetermined fuel demand requirement of the engine, the valve is operated with a constant opening pulse width at a respective frequency selected automatically from within the range of operating frequencies of the valve in accordance with the measured values of engine speed and engine load, whereas for all operations of the valve at or above said predetermined fuel demand requirement, the valve is operated at maximum frequency, the opening pulse width being selected automatically in accordance with the measured values of engine speed and engine load.

16. An air/fuel induction system according to claim 12, wherein the digital valve control means are arranged so that, for all operations of the digital valve below a predetermined fuel demand requirement of the engine, the valve is operated with a constant opening pulse width at a respective frequency selected automatically from within the range of operating frequencies of the valve in accordance with measured values of engine speed and engine load, whereas for all operations of the valve at or above said predetermined fuel demand requirement, the valve is operated at maximum frequency, the opening pulse width being selected automatically in accordance with the measured values of engine speed and engine load.

17. An air/fuel induction system for a spark ignition internal combustion engine, the system comprising an air/fuel induction passage with a driver-operable throttle valve therein, and a fuel system by which gaseous fuel is presented to a location in the induction passage; the fuel system including conduit means by which the gaseous fuel is conveyed to said location, a digital injection valve in said conduit means operable to effect injection of metered quantities of said gaseous fuel whereby said gaseous fuel is presented to said location, said digital valve being operable to continually open and close at a controlled frequency of opening and duration of each opening so as to control fuel flow in accordance with the frequency of its opening and the duration of each opening, and control means responsive to certain engine operating conditions and operable to control operation of said digital injection valve in accordance with those conditions such that the volumetric flow rate at which said gaseous fuel is injected for presentation to said location is matched to the operational requirements of the engine; wherein gaseous fuel flow diffusion means are provided within said conduit means between said injection valve and said induction passage whereby the pulsed output of the digital injection valve is smoothed prior to its presentation to said location in said injection passage.

* * * * *